United States Patent Office 3,395,976
Patented Aug. 6, 1968

3,395,976
PROCESS FOR THE SEPARATION OF
ZIRCONIUM FROM HAFNIUM
Oskar Glemser, 10 Richard-Zsigmondy-Weg, Gottingen, Germany, and Adolf von Baeckmann, Leopoldshafen, near Karlsruhe, Germany; said von Baeckmann assignor to said Glemser
No Drawing. Continuation-in-part of application Ser. No. 22,093, Apr. 14, 1960. This application Dec. 18, 1962, Ser. No. 245,402
Claims priority, application Germany, Apr. 15, 1959, G 26,842
6 Claims. (Cl. 23—22)

ABSTRACT OF THE DISCLOSURE

The process for separating zirconium from hafnium by repeated liquid-liquid solvent extraction of the corresponding chloride salts, exemplified by distributing the chloride salts at about 20°–60° between
(1) an inorganic phase consisting of an aqueous chloride ion solution which is 2 N–13 N with respect to HCl and
(2) an organic phase of halogenated hydrocarbon containing a soluble amine having a molecular weight of 150–400 such as tribenzylamine;
physically separating the organic and inorganic phases and recovering the enriched zirconium and any residual hafnium from the organic phase by precipitation and recovering the organic solvent of said organic phase. The corresponding inorganic phase, with enriched hafnium concentration, is also recovered when desired.

---

The present invention is a continuation-in-part of Ser. No. 22,093, filed on Apr. 14, 1960, and now abandoned and relates to a process for the separation of zirconium and hafnium from each other.

Among the numerous methods known for separating the elements zirconium and hafnium from one another, such as fractionated precipitation, fractionated crystallization, fractionated distillation, partial reduction, absorption chromatography or by means of ion exchangers, the distribution of appropriate compounds between two immiscible solvents (liquid-liquid extraction) has gained great technical interest, because such process is easy to to carry out in continuous manner.

These known processes for the separation of zirconium from hafnium by liquid-liquid extraction involve, however, some disadvantages. In order to distribute complex zirconium and hafnium compounds with the use of an organic complex-forming agent, very great amounts of these expensive complex-forming agents are required. When according to Huffman et al. (U.S. Patent 2,566,-665) betadiketones (for example, thenoyltrifluoroacetone) are used, only very small zirconium or hafnium concentrations are obtained in the organic phase. The costly thenoyltrifluoroacetone and the perchloric acid used render this process very expensive.

When as proposed in U.S. Patent 2,741,628 salicyclic acid is used as the complex-forming agent, only very small separating factors are obtained.

When the chlorides are distributed between an aqueous solution and ether, the minor solubility of these compounds in ether has to be taken into account.

When instead of the chlorides the rhodanides are subjected to a liquid-liquid extraction, it is observed that the extraction is considerably disturbed by precipitations taking place in the presence of sulfate ions; moreover, it is often impossible to obtain stable conditions of equilibrium. When no sulfate ions but chlorine ions are present in a minor concentration, the rhodanides can be distributed in various solvents, such as alcohols, ethers, ketones, aldehydes, esters or nitro compounds. The separation is, however, impeded by the iron present so that pre-purification is necessary. The use of the relatively expensive rhodanide in a partially high concentration and the sensitiveness of the process with respect to some anions, for example sulfates, are, however, disadvantageous.

When according to Wilhelm et al. (U.S. Patent 2,753,-250) zirconium values are extracted with e.g. tributyl phosphate in the solvent dibutyl ether, a nitric acid solution or a mixture of nitric acid with hydrochloric acid has to be used. The use of nitric acid, however, renders the process even more costly. Wilhelm et al. extract neutral compounds according to the following scheme:

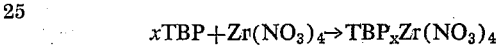

with
$x=1-3$ (probably 2);
TBP=tributyl phosphate

However, the present invention concerns a principally different extraction mechanism, where anionic chlorocomplexes are extracted. The extraction agents are organic amines:

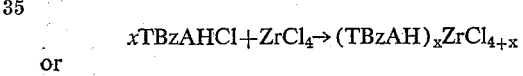

or

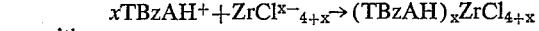

with
$x=2$ to 4;
TBzA=tribenzyl amine.

The inventive feature of our invention lies in the choice of a different extraction agent, namely, an amine resp. a substituted ammonium salt instead of a phosphoric acid ester according to Wilhelm et al.

When nitrates are distributed, poorer separating factors are obtained than in the process here described. In addition thereto, the complete re-extraction of zirconium from the organic phase is rendered difficult whereby the continuity of the process is impaired.

Coleman et al. (Proceedings of the Second United Nations International Conference on the Peaceful Uses of Atomic Energy, vol. 28, United Nations Publication, 1958, pages 278 to 288) used amine salts as solvent extraction reagents for uranium and other metals, e.g. zirconium and hafnium, but they did not at all aim at a separation of the zirconium from the hafnium, let alone achieved it. Only on page 286, left column, line 28, zirconium is mentioned besides hafnium as being extractible in the same manner, namely, that they cannot be separated from each other. This present invention will demonstrate that in spite of this teaching zirconium can be separated from the hafnium in an economic way, and the merit of this invention is that a novel and technically progressive process was found and developed for this purpose.

Also F. L. Moore (Analytical Chemistry, vol. 29, No. 11, November 1957, page 1661, column 3, paragraph 2) refers to the fact that "the extraction behaviour of hafnium was very similar to that of zirconium in the hydrochloric acid system." This statement is understandable because F. L. Moore utilized xylene whereas the present invention relates to the improved process for separation of zirconium and hafnium if a halogenated hydrocarbon is used as extracting agent.

The present invention is based on the observation that the solubility of chlorides and the separating effects are considerably improved by using a solution of an organic amine in a liquid halogenated hydrocarbon as the organic phase. In order to avoid hydrolysis, it is advantageous to use a hydrochloric acid solution as the inorganic phase.

It has been found that under the said conditions the coefficients of distribution (definition see below) of the zirconium are greater than those of the hafnium. The distribution involves no precipitations or other disturbances and the distribution equilibrium is rapidly produced so that the process of this invention can be used for repeated (multiplicative) distribution. The distribution of the zirconium and hafnium values between the organic and the inorganic, aqueous phase is carried out by mixing, i.e. intimately contacting the two phases, e.g. by shaking or stirring, and then separating the phases. The process disclosed in the instant invention offers the great advantage that zirconium oxychloride as obtained during the dressing of zirconium ores can be directly used.

The coefficient of distribution $k$ of a substance is defined as the quotient of its concentration in the organic phase divided by its concentration in the aqueous phase. The separating factor $\beta$ is defined as the quotient of the coefficient of distribution of the zirconium value divided by the coefficient of distribution of the hafnium value. It is possible to easily obtain a separating factor of $\beta=15$ and such is found sufficient for the complete separation of the two elements by multiplicative distribution. But one can carry out the process of the invention as well with separating factors $\beta=2.14$ (Example 13) or $\beta=26.7$ (Example 9). If the chloride ions in the inorganic phase are used in too small a concentration (below 5 N), neither zirconium nor hafnium is extracted, while in the inverse case (above 14.5 N), the two elements are substantially extracted so that separation is not achieved. Zirconium and hafnium are again removed quantitatively from the organic phase (e.g., a 0.2 molar solution of tribenzyl amine in chloroform) as soon as the chloride ion concentration in the inorganic aqueous phase is weaker than 5 N. The re-extraction from the organic phase may also be carried out with water.

The zirconium (hafnium) may subsequently be separated as zirconium (hafnium) oxychloride by evaporating the hydrochloric acid or precipitated with the aid of a base. The organic phase can be directly re-used after possible small losses have been compensated.

More especially, the process of this invention for the separation of zirconium from hafnium by liquid-liquid extraction is characterized in that one distributes the chlorides of the aforesaid elements between an inorganic phase consisting of an aqueous 5 N–14.5 N chloride ion solution which is 2 N–13 N as to hydrochloric acid and an organic phase consisting of a liquid halogenated hydrocarbon and a dissolved organic amine, by mixing the phases, the coefficient of distribution $k$—defined as the quotient of the concentration in the organic phase divided by the conceneration in the inorganic phase—of the zirconium values being greater than that of the hafnium values. The distribution of the chlorides may be repeated several times in either discontinuous or continuous manner. The process is carried out at an elevated temperature, especially at a temperature between about 20° C. and 60° C. After deposition one separates the phases from each other, precipitates zirconium plus hafnium from the inorganic phase by adding an ammonia solution, filters off, ashes, glows and weighs out the precipitate as mixture of zirconium dioxide and hafnium dioxide, and determines the zirconium dioxide and hafnium dioxide content therein analytically. One re-extracts the zirconium and hafnium chlorides from the organic phase with an aqueous 0 up to below 5 N—hydrochloride acid solution, precipitates zirconium plus hafnium from this inorganic phase by adding an ammonia solution, filters off, ashes, glows and weighs out the precipitate as mixture of zirconium dioxide and hafnium dioxide, and determines the zirconium dioxide and hafnium dioxide content therein analytically.

When only hydrochloric acid is contained in the inorganic, aqueous chloride ion solution containing the zirconium and hafnium values, its concentration should be above 5 N, preferably between about 8 N (Example 10) and 11.5 N (Example 5). But if in addition to the hydrochloric acid substantial amounts of certain other chlorides (ammonium chloride, the alkali metal chlorides or alkaline earth metal chlorides, especially lithium chloride) are contained in said aqueous solution, the concentration of the hydrochloric acid may be much lower, e.g. only 2 N or 3 N (Example 11).

The instant process can be carried out using saturated, olefinically unsaturated or aromatic halogenated hydrocarbons, especially chlorinated or brominated hydrocarbons. As halogenated hydrocarbons which are suitable for use in the process of this invention, there may be mentioned more especially: chloroform, bromoform, 1,1,2,2-tetrachloroethane, methylene chloride, orthodichlorobenzene, chlorobenzene, bromobenzene, benzyl chloride, dibromoethane, 1,2,3-trichloroisobutane, 1,2,3-trichlorobenbene or 1,2,4-trichlorobenzene or analogous compounds.

On the other hand, there are additionally used aliphatic or aromatic, primary, secondary or tertiary amines or their hydrochlorides and more especially organic amines of medium molecular weight of between about 150 and 400. Such amines are, for example, tribenzylamine, tri-n-octylamine, tri-n-butylamine, di-n-butylamine or analogous compounds. Generally, the amines are applied as about 0.2 to 0.4 molar solutions in liquid halogenated hydrocarbons (Examples 12 and 13). But the amines—if they are easily soluble—may also be used in much higher concentrations, e.g. up to about 2.1 molar solutions (Example 10). As a rule one works with organic solutions which are saturated to one-fourth at the respective substituted ammonium chloride or amine.

The following examples serve to illustrate the invention, but they are not intended to limit it thereto. The concentration of hafnium (zirconium) is indicated in percent by weight $HfO_2$ ($ZrO_2$) related to the sum of $HfO_2+ZrO_2$. The analyses were carried out radio-chemically with the use of $Hf^{181}$ (or $Zr^{95}$ in Example 7), or spectro-graphically.

EXAMPLE 1

10 cc. of a solution of 74 grams $ZrOCl_2 \cdot 8H_2O$ (hafnium content=about 1.7% in 1000 cc. 12.8 N-hydrochloric acid were mixed with 22 cc. concentrated hydrochloric acid (12.6 N) and 18 cc. distilled water and thoroughly shaken for about one minute in a separating funnel with 50 cc. of a solution of 30 grams tribenzylamine in 500 cc. chloroform (0.209 molar solution). After deposition, the phases were separated from each other and the zirconium together with the hafnium was precipitated from each of the two phases by adding an ammonia solution. The precipitate was filtered off, ashed, glowed and weighed out as zirconium dioxide. To determine the hafnium distribution, the specific activity of the radio-active preparations was determined. Under the measuring conditions, 7550 impulses/minute corresponded to 1 milligram hafnium dioxide.

The organic phase contained 41 mg. $ZrO_2$ and 0.046 mg. $HfO_2$ (hafnium content=0.112%).

The inorganic, aqueous phase containing 236 mg. $ZrO_2$ and 4.96 mg. $HfO_2$ (hafnium content=2.06%).

$$k_{Zr}=41\ 236=0.173;\ k_{Hf}=0.046\ 4.96=0.0093$$
$$\beta=0.173\ 0.0093=18.7$$

After separation, the aqueous phase was 8.6 normal as to chloride ions.

EXAMPLE 2

10 cc. of a solution of 74 grams $ZrOCl_2 \cdot 8H_2O$ (halfnium content=about 1.7%) in 1000 cc. 12.8 N-hydrochloric acid were mixed with 25 cc. concentrated hydrochloric acid 12.6 N) and 15 cc. distilled water and thoroughly shaken about one minute in a separating funnel with 50 cc. of a solution of 30 grams tribenzylamine in 500 cc. chloroform (0.209 molar solution). The further procedure was the same as that described in Example 1.

The organic phase contained 136 mg. $ZrO_2$ and 0.314 mg. $HfO_2$ (hafnium content=0.23%).

The inorganic, aqueous phase contained 142 mg. $ZrO_2$ and 4.53 mg. $HfO_2$ (hafnium content=3.09%).

$$k_{Zr}=1.36\ 1.42=0.96;\ k_{Hf}=0.314\ 4.53=0.069$$
$$\beta=k_{Zr}\ k_{Hf}=13.8$$

After separation, the aqueous phase was 9.3 normal as to chloride ions.

EXAMPLE 3

A solution of 6 grams tribenzylamine in 100 cc. chloroform was shaken in a separating funnel with 70 cc. 12.6 N-hydrochloric acid and 30 cc. water. The inorganic phase was separated while the organic phase was shaken for 1 minute in a separating funnel with 100 cc. 8.65 N-hydrochloric acid containing 1.40 grams $ZrO_2$ in the form of $ZrOCl_2$ (hafnium content=about 1.7%). After the separation the inorganic phase was 8.85 normal as to chloride ions and contained 1.14 grams $ZrO_2$ with a hafnium content of 2.13%. The organic phase contained 257.5 mg. $ZrO_2$, corresponding to 18.5% of the material used, and 0.138% $HfO_2$.

$$k_{Zr}=0.228;\ k_{Hf}=0.0146;\ \beta=k_{Zr}\ k_{Hf}=15.6$$

The organic phase was shaken with 100 cc. 8.75 N-hydrochloric acid. The inorganic phase then contained 145.5 milligrams $ZrO_2$ with a hafnium concentration of 0.25%. It was 8.75 normal as to chloride ions. The organic phase contained 112 mg. $ZrO_2$ with 0.019% $HfO_2$.

$$k_{Zr}=0.772;\ k_{Hf}=0.0644;\ \beta=12.0$$

The organic phase was again shaken with 100 cc. 8.85 N-hydrochloric acid. 44 milligrams $ZrO_2$ containing 0.04% hafnium went into the inorganic phase which was 8.85 normal as to chloride ions. The organic phase was shaken with 120 cc. 2 N-hydrochloric acid. All the zirconium and hafnium went into the inorganic phase where the elements were determined as $ZrO_2$ by precipitation with ammonia and glowing the precipitate. The organic phase was isolated before the ammonia precipitation and could be used again. 68.03 milligrams $ZrO_2$ containing 0.005% hafnium were obtained from the 2 N-hydrochloric acid-layer. No hafnium could be detected by spectrum analysis.

$$k_{Zr}=1.55;\ k_{Hf}=0.165;\ \beta=9.4$$

EXAMPLE 4

90 cc. 9.6 N-hydrochloric acid which contained 178 milligrams zirconium dioxide in the form of zirconyl chloride (hafnium content=1.17%) were extracted with 90 cc. of a solution of 6 grams tribenzylamine in 100 cc. chloroform (0.209 M solution), which had previously been shaken with the same volume of 9 N-hydrochloric acid. The phases were analyzed and the following result was obtained: The organic phase contained 126 mg. $ZrO_2$ and 0.261 mg. $HfO_2$ (hafnium content=0.207%).

The inorganic phase contained 51.12 mg. $ZrO_2$ and 1.77 mg. $HfO_2$ (hafnium content=3.34%).

$$k_{Zr}=2.46;\ k_{Hf}=0.148;\ \beta=16.6$$

EXAMPLE 5

90 cc. 11.5 N-hydrochloric acid which contained 176 milligrams zirconium dioxide in the form of zirconyl chloride (hafnium content=1.17%) were extracted with 90 cc. of a solution of 6 grams tribenzylamine in 100 cc. chloroform (0.209 molar solution) which had previously been shaken with the same volume of 9 N-hydrochloric acid. The phases were analyzed and the following result was obtained: The organic phase contained 170.5 mg. $ZrO_2$ and 1.27 mg. $HfO_2$ (hafnium content=0.74%).

The inorganic phase contained 6.42 mg. $ZrO_2$ and 0.793 mg. $HfO_2$ (hafnium content=11%).

$$k_{Zr}=26.6;\ k_{Hf}=1.59;\ \beta=16.65$$

EXAMPLE 6

9.2 N-hydrochloric acid and a solution of 60 grams tribenzylamine in 1 liter chloroform were conducted in counter-current in a 5 stage mixer-settler-column. The organic phase which ran off was shaken with 2 N-hydrochloric acid and again used. 13.3 N-hydrochloric acid, which contained 30.6 mg./ml. zirconium dioxide in the form of zirconyl chloride (hafnium content=1.17%), was introduced into the third stage. After the equilibrium had been adjusted, 16% of the ziconium dioxide used which contained 6.6% hafnium were found in the inorganic phase running off in continuous operation. The extract of the organic phase contained 84% of the used zirconium dioxide with 0.03% hafnium.

EXAMPLE 7

6500 milligrams hafnium dioxide containing 4% zirconium were converted into the oxychloride and the latter was dissolved in 1125 cc. 9.3 N-hydrochloric acid. The solution so obtained was extracted 10 times with a solution of 66 grams tribenzylamine in 1100 cc. chloroform (0.209 molar solution). After separation, the organic phase was shaken each time with 1 liter 2 N-hydrochloric acid to remove the extracted hafnium which—as compared with the starting material containing 4% zirconium—is now enriched with zirconium, i.e. it contains more than 4% zirconium. The organic phase was then used again. After the tenth extraction, the aqueous phase was mixed with ammonia. 2465 milligrams hafnium dioxide containing 0.01% zirconium were obtained from the aqueous phase.

EXAMPLE 8

A solution of 1.5 grams tribenzylamine in 25 cc. bromoform (0.2 molar solution) was shaken with a solution of 61.2 milligrams zirconium dioxide in the form of zirconyl chloride (hafnium content=1.17%) in 25 cc. 9.25 N-hydrochloric acid. The phases were analyzed and the following result was obtained: The organic phase contained 26.88 mg. $ZrO_2$ (hafnium content=0.22%); the inorganic phase contained 34.32 mg. $ZrO_2$ (hafnium content=2%) $k_{Zr}=0.78;\ k_{Hf}=0.095;\ \beta=8.2.$

EXAMPLE 9

A solution of 3 grams tribenzylamine in 50 cc. 1,1,2,2-tetrachloroethane (0.2 molar solution) was shaken with a solution of 333 milligrams zirconium dioxide (in the form of zirconyl chloride; hafnium content=1.17%) in 50 cc. 9.35 N-hydrochloric acid. The phases were very difficult to separate. After standing for 12 hours, the phases had clarified so that aliquot parts could be removed. The phases were analyzed and the following result was obtained: 25 cc. organic phase contained 55.31 mg. $ZrO_2$ (hafnium content=0.046%); 25 cc. inorganic phase contained 98.44 mg. $ZrO_2$ (hafnium content=1.24%); $k_{Zr}$=0.56; $k_{Hf}$=0.021; $\beta$=26.7.

EXAMPLE 10

25 cc. of a solution of equal parts by volume tri-n-butylamine in methylene chloride (2.1 molar solution of tri-n-butylamine), which had been saturated with hydrochloric acid while cooling with ice, were shaken with a solution of 272 milligrams zirconium dioxide (in the form of zirconyl chloride hafnium content=1.7%) in 50 cc. 8.07 N-hydrochloric acid. The phases were analyzed and the following result was obtained: $k_{Zr}$=29.7; $k_{Hf}$=1.89; $\beta$=15.7. 86.5% of the zirconium and 29.2% of the hafnium were extracted by the organic phase.

EXAMPLE 11

100 milligrams $ZrO_2$ (in the form of $ZrOCl_2$; hafnium content=1.17%) and 33 grams lithium chloride were dissolved in 50 cc. 3-N-hydrochloric acid, the resulting solution was 14.5 N as to chloride ions and was extracted with 50 cc. of a solution of 6 grams tribenzylamine in 100 cc. chloroform (0.2 molar solution), which latter solution had previously been shaken with 3 N-hydrochloric acid. The phases were analyzed and the result was obtained: $k_{Zr}$=13.3; $k_{Hf}$=3.1; $\beta$=4.4.

EXAMPLE 12

In each case 50 cc. of a 0.2 molar solution of the amine specified below in chloroform were shaken with 50 cc. 9.5 N-hydrochloric acid containing 200 milligrams $ZrO_2$ (hafnium content=1.17%). The two phases were separated, then filtered through filter flake stuffing filters and analyzed.

The following results were obtained:

(a) Tribenzylamine

Extracted: 69.7 mg. $ZrO_2$ containing 0.15% $HfO_2$
Not extracted: 129.9 mg. $ZrO_2$ containing 1.95% $HfO_2$
Separating factor: $\beta$=13.1; good phase separation (b) Tri-n-octylamine Extracted: 53.3 mg. $ZrO_2$ containing 0.195% $HfO_2$
Not extracted: 146.3 mg. $ZrO_2$ containing 1.68% $HfO_2$
$k_{Zr}$=0.364; $k_{Hf}$=0.042
Separating factor: $\beta$=8.7; good phase separation (c) Tri-n-butylamine Extracted: 43.1 mg. $ZrO_2$ containing 0.23% $HfO_2$
Not extracted: 156.2 mg. $ZrO_2$ containing 1.75% $HfO_2$
$k_{Zr}$=0.276; $k_{Hf}$=0.037
Separating factor: $\beta$=7.5; good phase separation

EXAMPLE 13

50 cc. of a 0.4 molar solution of di-n-butylamine in chloroform were shaken with 50 cc. 10 N-hydrochloric acid containing 100 milligrams zirconium dioxide (hafnium content=1.17%).

Extracted: 27.12 mg. $ZrO_2$ containing 0.6% $HfO_2$
Not extracted: 72.56 mg. $ZrO_2$ containing 1.28% $HfO_2$
Separating factor: $\beta$=2.14; good phase separation.

EXAMPLE 14

In each case 50 cc. of a solution of 1.85 grams tri-n-butylamine in the respective halogenated hydrocarbon (0.2 molar solution) were shaken with 50 cc. 10 N-hydrochloric acid containing 100 milligrams $ZrO_2$ (hafnium content=1.17%). The phases were separated, filtered and analyzed.

The following results were obtained with:

(a) Ortho-dichlorobenzene

Extracted: 78.32 mg. $ZrO_2$ containing 0.48% $HfO_2$
Not extracted: 17.30 mg. $ZrO_2$ containing 4.25% $HfO_2$
Separating factor: $\beta$=9.0

(b) 1,2,3- and 1,2,4-trichlorobenzene (mixture)

Extracted: 35.46 mg. $ZrO_2$ containing 0.175% $HfO_2$
Not extracted: 57.87 mg. $ZrO_2$ containing 1.62% $HfO_2$
Separating factor: $\beta$=9.2

(c) Chlorobenzene

Extracted: 66.79 mg. $ZrO_2$ containing 0.38% $HfO_2$
Not extracted: 23.29 mg. $ZrO_2$ containing 2.9% $HfO_2$
Separating factor: $\beta$=7.7

(d) Bromobenzene

Extracted: 64.32 mg. $ZrO_2$ containing 0.33% $HfO_2$
Not extracted: 30.23 mg. $ZrO_2$ containing 2.8% $HfO_2$
Separating factor: $\beta$=8.5

(e) Benzyl chloride

Extracted: 68.00 mg. $ZrO_2$ containing 0.34% $HfO_2$
Not extracted: 24.5 mg. $ZrO_2$ containing 3.4% $HfO_2$
Separating factor: $\beta$=10.1

(f) 1,2-dibromoethane

Extracted (only 20 cc. of each of the two phases were used): 14.83 mg. $ZrO_2$ containing 0.23% $HfO_2$
Not extracted: 22.04 mg. $ZrO_2$ containing 1.95% $HfO_2$
Separating factor $\beta$=8.6

(g) 1,2,3-trichloroisobutane

Extracted: 74.16 mg. $ZrO_2$ containing 0.38% $HfO_2$
Not extracted: 20.24 mg. $ZrO_2$ containing 3.5% $HfO_2$
Separating factor: $\beta$=9.3

We claim:
1. A process for the separation of zirconium from hafnium by repeated liquid-liquid solvent extraction of the corresponding chloride salts, which comprises distributing the metal chlorides thereof at a temperature of about 20° C.–60° C. between
   (1) an inorganic phase consisting essentially of an aqueous 5 N–14.5 N chloride ion solution which is 2 N–13 N as to hydrochloric acid and
   (2) an organic phase consisting essentially of a solvent selected from the group consisting of chloroform, bromoform, 1,1,2,2-tetrachloroethane, methylene chloride, orthodichlorobenzene, chlorobenzene, bromobenzene, benzyl chloride, dibromoethane, 1,2,3-trichloroisobutane, 1,2,3-trichlorobenzene and 1,2,4-trichlorobenzene; said solvent containing an active amount of a dissolved amine selected from the group consisting of tribenzylamine, tri-n-octylamine, tri-n-butylamine, di-n-butylamine and a hydrochloride thereof;
the coefficient of distribution of the zirconium ($k_{Zr}$) being greater than that of the hafnium ($k_{Hf}$) and the quotient of $k_{Zr}/k_{Hf}$ is at least 2.14; separating the organic and inorganic phases, and precipitating out the zirconium and enriched hafnium from the inorganic phase by adding an ammonia solution; and reextracting enriched zirconium plus residual hafnium chlorides from the organic phase with an aqueous 0–5 N-hydrochloric acid solution, and thereafter precipitating the enriched zirconium plus hafnium therefrom.

2. The process of claim 1, wherein the organic phase is an 0.2–2.1 molar amine solution.

3. The process of claim 1, wherein the inorganic phase consists of a 5 N–13 N-hydrochloric acid solution.

4. The process of claim 1, wherein the inorganic phase consists of an 8 N–11.5 N-hydrochloric acid solution.

5. The process of claim 1, wherein the inorganic phase contains hydrochloric acid and at least one chloride selected from the group consisting of an ammonium chloride, alkali metal chloride and alkaline earth metal chloride.

6. The process of claim 5, wherein the alkali metal chloride is lithium chloride.

References Cited

UNITED STATES PATENTS

| | | | |
|---|---|---|---|
| 2,269,498 | 1/1942 | Wainer | 23—15 X |
| 2,566,665 | 9/1951 | Huffman et al. | 23—18 |
| 2,741,628 | 4/1956 | Plucknett | 23—312 X |
| 2,753,250 | 7/1956 | Wilhelm et al. | 23—312 |
| 2,757,081 | 7/1956 | Hure et al. | 23—22 X |

OTHER REFERENCES

Coleman et al.: "Proceedings of the Second United Nations International Conference on the Peaceful Uses of Atomic Energy," vol. 28, United Nations Publication, Geneva, 1958, pp. 278–288.

Huffman et al.: "Journal of the American Chemical Society," vol. 71, 1949, p. 4147.

Kraus et al.: "Journal of the American Chemical Society," vol. 71, 1949, p. 3263.

Kraus et al.: "Journal of the American Chemical Society," vol. 73, 1951, pp. 9 to 13.

OSCAR R. VERTIZ, *Primary Examiner.*

H. T. CARTER, *Assistant Examiner.*